United States Patent
Takeuchi et al.

[11] Patent Number: 5,948,996
[45] Date of Patent: Sep. 7, 1999

[54] MULTIELEMENT SENSOR

[75] Inventors: Yukihisa Takeuchi, Nishikamo-gun; Masahiko Namerikawa, Inazawa; Kazuyoshi Shibata, Mizunami, all of Japan

[73] Assignee: NGK Insulators, Ltd., Japan

[21] Appl. No.: 09/047,117

[22] Filed: Mar. 24, 1998

[30] Foreign Application Priority Data

Apr. 4, 1997 [JP] Japan .................................. 9-86356

[51] Int. Cl.$^6$ .................. G01L 1/00; G01L 3/00
[52] U.S. Cl. .................. 73/862.043; 73/862.041; 73/504.03; 73/510
[58] Field of Search ............... 73/514.34, 510, 73/514.29, 504.03, 504.12, 862.041, 862.043, 862.68; 310/329, 311, 331, 366, 369

[56] References Cited

U.S. PATENT DOCUMENTS

| | | | |
|---|---|---|---|
| 4,950,914 | 8/1990 | Kurihara et al. | 73/514.34 |
| 5,100,498 | 3/1992 | Takeuchi et al. | 29/827 |
| 5,365,799 | 11/1994 | Okada | 73/862.041 |
| 5,414,322 | 5/1995 | Kosinski et al. | 310/366 |
| 5,571,972 | 11/1996 | Okada | 73/862.043 |
| 5,814,922 | 9/1998 | Uchino et al. | 310/366 |

FOREIGN PATENT DOCUMENTS

| | | |
|---|---|---|
| 0 731 357 A1 | 9/1995 | European Pat. Off. . |
| 08035981 | 7/1994 | Japan . |
| 8-94661 | 12/1996 | Japan . |

*Primary Examiner*—Hezron Williams
*Assistant Examiner*—Helen C. Kwok
*Attorney, Agent, or Firm*—Wall Marjama Bilinski & Burr

[57] ABSTRACT

A small-sized multielement sensor is capable of two- or three-dimensionally detecting a physical quantity. The sensor has the capability of compensating for an incorrect detection result given by a failed sensor element using detection results given by the other sensor elements thereby ensuring high accuracy is achieved regardless of the failure. The multielement sensor includes: a base including a disk-shaped substrate, an outer wall, and a column which are all disposed so that their center is located at the same point; flexible plates which are disposed along a circular line in such a manner that one end of each flexible plate is in contact with the outer wall and the other end is in contact with the column; weights suspended at the center of the lower surface of the respective flexible plates; and piezoelectric elements each having a pair of electrodes and disposed on both ends in the longitudinal direction of the flexible plates.

10 Claims, 7 Drawing Sheets

MULTIELEMENT SENSOR

BACKGROUND OF THE INVENTION

1. Field of the Invention

The present invention relates to a multielement sensor for two- or three-dimensionally detecting the magnitude and the direction of a physical quantity applied from the outside, and more particularly, to a multielement sensor including a great number of sensor elements disposed at peripheral locations along a closed circular line wherein if some sensor elements have a failure, the detection result of the failed sensor element is rejected thereby ensuring that the physical quantity can be detected accurately regardless of the failure.

2. Description of Related Art

In the automobile, mechanical, and related industries, there is an increasing need for a sensor capable of accurately detecting an acceleration which is encountered by an object when various types of external forces are applied to the object. In particular, there is a need for a small-sized sensor capable of detecting such an external force for each of two- or three-dimensional components.

The sensor of such a type can be used, for example, as a sensor in a mechanism for automatically controlling the position of a car so that when the car goes into a wrong position as a result of an abrupt steering operation or due to a strong transverse wind, the car is automatically recovered into a right position. The sensor can also be used to control a crane so that it is in a stable position. Furthermore, the sensor can also be used in a mechanism for detecting the change in a flow rate of fluid flowing through a pipe and controlling the flow rate by opening and closing a valve.

Figure 7:
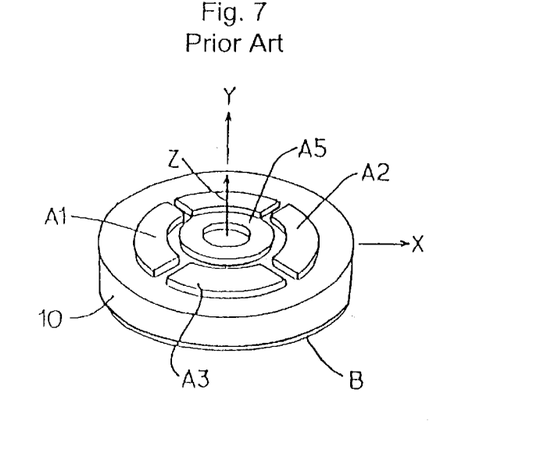
FIG. 7 is a perspective view illustrating a three-dimensional sensor according to a conventional technique.

FIG. 7 illustrates an example of such a sensor 11 disclosed in Japanese Patent Application Laid-open No. 8-94661, in which upper electrodes A1–A5 are disposed on the upper surface of a disk-shaped piezoelectric element 10, and a ring-shaped cavity is formed around the origin O on the lower surface so that the location of the ring-shaped cavity corresponds to the location of the upper electrodes A1–A5. The portion of the piezoelectric element 10 where the ring-shaped cavity is formed serves as a thin flexible portion. Furthermore, a lower electrode B is formed on the lower surface of the piezoelectric element 10.

In this sensor 11, if the side face of the piezo-electric element 10 is fixed to a case, then the central portion located inside the ring-shaped cavity serves as a weight suspended by the flexible portion. When a force is applied on the weight, the flexible portion is deformed, and a charge is generated on the upper electrodes A1–A5 depending on the magnitude and direction of the applied force. The electrodes A1 and A2 detect only an X-direction component of the applied force, the electrodes A3 and A4 detect only a Y-direction component, and the electrode A5 detects only a Z-direction component, independently of each other. Detection of these components makes it to determine the magnitude and direction of the force applied on the sensor.

Figure 8:
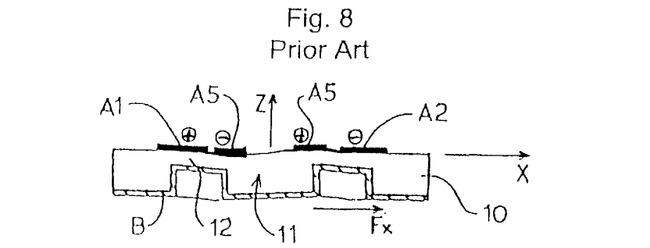
FIG. 8 is a cross-sectional view of the conventional three-dimensional sensor in a state in which a force is applied in the X direction.
Figure 9:
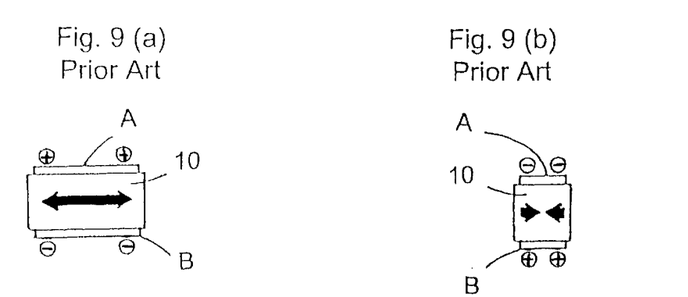
FIGS. 9(a) and 9(b) are a cross-sectional view illustrating the polarization characteristic of a piezoelectric element used in the three-dimensional sensor.

For example, when a force Fx in the X direction is applied on the sensor 11, the flexible portion 12 is deformed in such a manner as shown in the cross-sectional view of FIG. 8. As a result, the upper electrode A1 disposed in the X direction is expanded in the X direction while the upper electrode A2 is contracted in the X direction. Furthermore, in FIG. 8, the portion on the left side of the upper electrode A5 is contracted in the X direction while the portion on the right side of the upper electrode A5 is expanded in the X direction. In this situation, the piezoelectric element located under the upper electrodes is polarized, as shown in FIGS. 9(a) and 9(b), in different manners depending on the direction of the stress which occurs in particular portions of the piezoelectric element wherein the upper electrodes A1–A5 are collectively denoted by A. As a result, charges having polarities as shown in FIG. 8 appear on the upper electrodes A1, A2, and A5, respectively. Since the upper electrode A5 is a single electrode having a shape symmetric about the origin O, charges which are generated in the manner shown in FIG. 8 are canceled out, and no charge appears as a whole on the upper electrode A5. Similarly, no charge appears as a whole on the lower electrode B because it is formed as a single and common electrode. Therefore, if a difference between the charge generated on the upper electrode A1 and that on the upper electrode A2, then the X-direction component Fx of the applied force can be determined. Similarly, the Y-direction component of the force can be determined by the upper electrodes A3 and A4.

Figure 10:
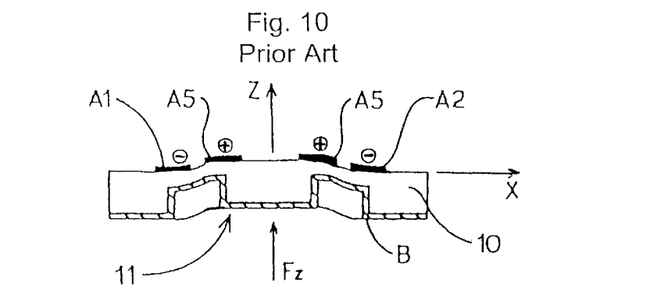
FIG. 10 is a cross-sectional view of the conventional three-dimensional sensor in a state in which a force is applied in the Z direction.

On the other hand, when a force Fz in the Z direction is applied on the sensor 11, a deformation occurs in the sensor as shown in FIG. 10, and a corresponding charge is generated on the upper electrode A5. The charge generated on the lower electrode B is canceled out, and thus it is possible to detect the force Fz on the basis of the charge generated on the upper electrode A5. In this situation, although charges are also generated on the upper electrodes A1–A4, these charges can be canceled out by means of proper electric connections among the electrodes A1–A4 and proper calculation process so that the upper electrodes A1–A4 are used to detect components in X and Y directions.

In the sensor 11 described above, if the entire flexible portion is formed of a piezoelectric material as shown in FIG. 7, charges generated in a deformed portion of the flexible portion are scattered into other portions in which there is only a slight or absolutely no deformation. This causes a reduction in the sensitivity of the sensor.

Although it is possible to increase the sensitivity of the sensor by increasing the size of the weight so as to make the flexible plate deformable to a greater extent, this technique is unsuitable because such an increase in weight will result in an undesirable increase in the total size of the sensor, and thus it will become impossible to realize a sensor with a desired small size.

Furthermore, in the sensor 11 described above, force components in the respective directions are determined by calculation on the basis of the charges detected by the pair of electrodes A1 and A2 and the pair of electrodes A3 and A4. If some failure occurs, as in the case where a lead wire is disconnected from a certain electrode or as in the case where the flexible member made of a piezoelectric material is broken, then the calculation of the force is performed based on the incorrect detection values, and thus the result is incorrect.

SUMMARY OF THE INVENTION

In view of the above, it is an object of the present invention to provide a sensor having the capability of compensating for an incorrect detection value given by a failed sensor element using detection values given by the other sensor elements having no failure. This ensures highly accurate detection while maintaining the advantages of conventional sensors in terms of the small size and the capability of two- or three-dimensionally detecting a physical quantity with a single sensor.

According to an aspect of the present invention, there is provided a multielement sensor comprising: a substrate, an outer wall formed on a peripheral portion of said substrate and having an uniform thickness and an uniform height, and a column having a height equal to that of the outer wall. This column is disposed inside the outer wall on the substrate in such a manner that the center of the column is located at the same point where the center of the substrate is located and such that a ring-shaped cavity is formed between the outer wall and the column. Also included are sensor elements each comprising a flexible plate having a flat plate shape being long along one direction in a rectangular coordinate system in a plane, and a weight located at the center of one flat surface of said flexible plate. Piezoelectric elements each having one pair of opposite electrodes, are located on the flat surface opposite to the flat surface on which the weight is located, with one of the piezoelectric elements located on one end in the longitudinal direction of the flexible plate and the other piezoelectric element located on the other end of the flexible plate. The sensor elements are disposed in a circular line along the ring-shaped cavity in such a manner that each sensor element extends across the ring-shaped cavity. One end of the flexible plate is in contact with said column and the other end is in contact with said outer wall, such that the weight of each sensor element is suspended in the ring-shaped cavity. The flexible plates and the piezoelectric elements are deformed by the weights in response to a force applied on the weights thereby detecting a charge produced in the piezoelectric elements thus detecting the force applied on the weights. At least four or more sensor elements are disposed around an axis, at locations symmetric about the axis. This axis passes through the center of the substrate and extends in a direction perpendicular to the flat plane of the substrate. The sensor elements are disposed so that they are not in contact with each other.

In this multielement sensor, the base, flexible plates, and weights may be produced into an integral fashion by means of a laminating process using zirconia green sheets. The piezoelectric elements may be produced by forming electrodes and piezoelectric materials by means of a screen printing process and a baking process performed thereafter. Alternatively, the base, flexible plates, and weights may also be produced in an integral fashion by means of a laminating process using green sheets of a piezoelectric ceramics. Still alternatively, the flexible plates may be made of piezoelectric ceramic, and instead of the piezoelectric elements, pairs of electrodes are formed directly on both ends in the longitudinal direction of the respective flexible plates such that the flexible plates are sandwiched between the pairs of electrodes, thereby making the flexible plates have the function performed by the piezoelectric elements.

According to another aspect of the invention, there is provide an a multielement sensor comprising: a base comprising a substrate, an outer wall formed on a peripheral portion of the substrate and having an uniform thickness and an uniform height. A cylindrical wall having an uniform thickness and having a height equal to that of the outer wall, is also provided. The cylindrical wall is disposed inside the outer wall on the substrate that the center of the cylindrical wall is located at the same point where the center of the substrate is located. First sensor elements each comprising a first flexible plate having a flat plate shape being long along one direction in a rectangular coordinate system in a plane, a first weight located at the center of one flat surface of the first flexible plate, and first piezoelectric elements each having one pair of opposite electrodes. The first piezoelectric elements are located on the flat surface opposite to the flat surface on which the first weight is located. One of said first piezoelectric elements is located on one end in the longitudinal direction of said first flexible plate and the other first piezoelectric element is located on the other end of the first flexible plate. A second sensor element comprising: a second flexible plate, a second weight having a column shape disposed at the center of the second flexible plate so that the center of the second weight is located at the same point where the center of the second flexible plate is located. A second piezoelectric element is disposed in the outer peripheral area on one surface of the second flexible plate, the second piezoelectric element comprising a piezoelectric material in the form of a ring-shaped flat plate. Second electrodes are formed on both surfaces of the piezoelectric material, the piezoelectric element has a shape symmetric about the central point of the second flexible plate. The first sensor elements are disposed in a circular line along the ring-shaped cavity in such a manner that each first sensor element extends across the ring-shaped cavity. One end of the first flexible plate is in contact with the cylindrical wall and the other end is in contact with the outer wall. The first weight of each first sensor element is suspended in the ring-shaped cavity, and the first flexible plate and the first piezoelectric element are deformed by the first weight in response to a force applied on the first weight thereby detecting a charge produced in the first piezoelectric elements. The second sensor element is disposed on the top of a cavity formed inside the cylindrical wall so that the second piezoelectric element is located on the outer surface of the second sensor such that the cavity is covered by the second sensor element. The second sensor is responsible for detecting a charge generated in the second piezoelectric element. The charge is generated by deformation occurring in the second flexible plate and in the second piezoelectric element in response to a force applied on the second weight in a direction perpendicular to the flat plane of the substrate, thereby detecting a charge produced in the second piezoelectric element. This allows the force applied on the first and second weights, to be detected wherein at least four or more first sensor elements are disposed around an axis, at locations symmetric about the axis, the axis passing through the center of the substrate and extending in a direction perpendicular to the flat plane of the substrate, the first sensor elements being disposed so that they are not in contact with each other.

In this multielement sensor, the base, first and second flexible plates, and first and second weights may be produced into an integral fashion by means of a laminating process using zirconia green sheets. The first and second piezoelectric elements are produced by forming electrodes and piezoelectric materials by means of a screen printing process and a baking process performed thereafter. Alternatively, the base, first and second flexible plates, and first and second weights may be produced into an integral fashion by means of a laminating process using green sheets of piezoelectric ceramic. Still alternatively, the first and second flexible plates may be made of piezoelectric ceramic, instead of the first piezoelectric elements. Pairs of electrodes are formed directly on both ends in the longitudinal direction of the respective flexible plates in such a manner that the flexible plates are sandwiched between the pairs of electrodes, thereby making the flexible plates have the function performed by the first piezoelectric elements; and instead of the second piezoelectric elements, a pair of electrodes is formed in the outer peripheral portion of the flexible plate in such manner that the second flexible plate is sandwiched between the pair of electrodes, thereby making the second flexible plate have the function performed by the second piezoelectric elements.

DESCRIPTION OF THE PREFERRED EMBODIMENTS

In the present invention, a multielement sensor includes at least four sensor elements each having a weight wherein these sensor elements are disposed at peripheral location of the sensor. When a failure occurs in some sensor element, the failure is detected by comparing the detection result with detection values given by the other sensor elements, and the incorrect detection value is compensated for, thereby ensuring that high accuracy is achieved in detection regardless of the failure.

The present invention is now described in further detail below with reference to, but not limited to, preferred embodiments in conjunction with the accompanying drawings.

Figure 1:
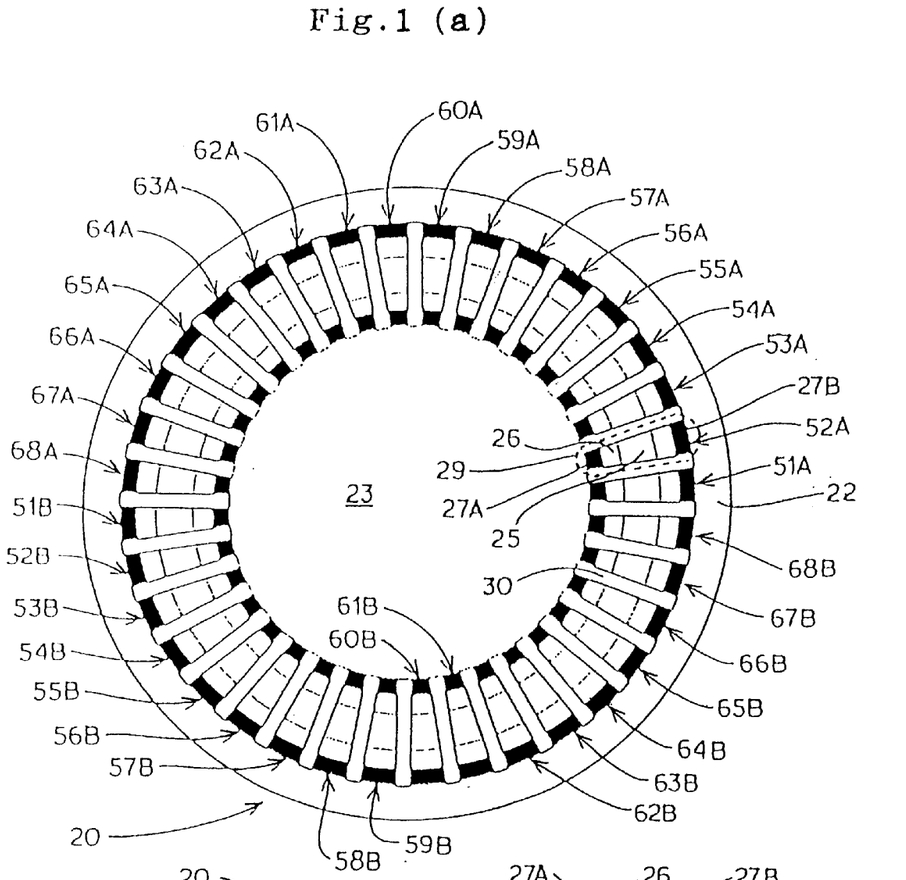
FIGS. 1(a) and 1(b) are a plan view and a cross-sectional view, respectively, of an embodiment of a multielement sensor according to the invention.

FIGS. 1(a) and 1(b) illustrate a multielement sensor 20 according to the present invention, wherein a plan view is given in FIG. 1(a) and a cross-sectional view thereof is given in FIG. 1(b). This multielement sensor 20 is particularly suitable as a two-dimensional sensor for detecting a force applied in a two-dimensional direction in a plane parallel to a flat disk-shaped substrate 21. The multielement sensor 20 has a base comprising: a disk-shaped substrate 21; a cylindrical-shaped outer wall 22; and a cylindrical column 23 wherein these elements are disposed so that the center of each element is located at the same point and so that a ring-shaped cavity 28 is formed between the outer wall 22 and the cylindrical column 23. The outer wall 22 and the cylindrical column 23 are equal in height.

There are also provided sector-shaped flexible plates 26 and weights 25 suspended below the respective flexible plates 26, at the center of the flexible plates 26. Furthermore, there are also provided piezoelectric elements 27A and 27B each consisting of a piezoelectric material on which a pair of electrodes are formed, wherein the piezoelectric elements 27A and 27B are formed at least partially on the surface of the flexible plates 26 opposite to the surface on which the weights 25 are provided and wherein the piezoelectric elements 27A and 27B are located on both ends (inner and outer ends) in the longitudinal direction of the respective flexible plates 26. Each sensor element 29 is formed of one flexible plate 26, one weight 25, and two piezoelectric elements 27A and 27B. A plurality of sensor elements 29 are disposed along a circular line in the peripheral portion of the sensor in such a manner that each sensor element 29 extends across the cavity 28 in a radial direction so that one end in the longitudinal direction of each flexible plate 26 is in contact with the column 23 and the other end is in contact with the outer wall 22, thereby obtaining the multielement sensor 20 in a complete form.

In this specific embodiment, one multielement sensor 20 includes 36 sensor elements 29 which are disposed along a circular line in the peripheral portion, around an axis which passes through the center of the multielement sensor 20 and which extends in a direction perpendicular to the flat plane of the disk-shaped substrate 21, so that the locations of the sensor elements 29 are symmetric about the above-described axis. The sensor elements 29 are isolated from each other by gaps 30. In the simplest case, the multielement sensor 20 needs four sensor elements 29 to accomplish detection of a force according to the method described later. The detection sensitivity can be increased by employing a greater number of sensor elements. However, the increase in the number of sensor elements 29 results in an increase in the complexity of production process and thus a reduction in the production yield. Therefore, it is generally preferable to employ 8 to 54 sensor elements.

In the multielement sensor 20, the disk-shaped substrate 21 serves as a bottom plate of the multielement sensor 20 and is used to attach the multielement sensor 20 to various machines and apparatus. In other words, it is possible to remove the disk-shape substrate 21 from the multielement sensor 20 and attach the remaining part, which can function as a multielement sensor, to various machines and apparatus in such a manner that the bottoms of the outer wall 22 and the cylindrical column 23 are in direct contact with the machines and apparatus. However in the structure including no disk-shaped substrate 21, the sensor elements 29 extending between the outer wall 22 and the cylindrical column 23 have a tendency to be easily broken by a mechanical load. Furthermore, when a multielement sensor having such a structure is installed, it is required that two members, that is, the outer wall 22 and the cylindrical column 23 be fixed to a machine so that stress is equally applied on all sensor elements. Thus, a troublesome process is needed in the installation. Besides, there is a possibility that sensitivity is degraded during the installation process. For the above reasons, it is preferable that the multielement sensor 20 include the disk-shaped substrate 21.

The outer wall 22 and the cylindrical column 23 are members for supporting the sensor elements 29 between the outer wall 22 and the cylindrical column 23. To achieve this purpose, it is preferable that these members be made of a material having a great enough mechanical strength and a great enough elastic modulus to exert no bad effect on the sensor elements 29. Metallic materials such as cast iron and stainless steel and various types of ceramic may be employed. For the same reason, it is preferable to employ a similar material for the disk-shaped substrate 21 on which the outer wall 22 and the cylindrical column 23 are placed.

Preferably, the base 24 including the disk-shaped substrate 21, the outer wall 22 and the cylindrical column 23 is produced into an integral fashion using the same material. More specifically, in the case where the base 24 is made of a metallic material, it may be produced into an integral fashion using a sintered metal by means of a powdered metal technique. Alternatively, a disk of metal with a fixed thickness is machined in such a manner as to form a ring-shaped cavity 28. Still alternatively, the respective members may be first formed separately, and then they may be combined together by means of welding or a similar technique. In the case where the base 24 is made of a ceramic material, the base 24 may be produced as follows. That is, a disk of ceramic is first formed by means of pressing or casting so that its thickness becomes equal to the thickness of the base 24 after the baking process performed later. Then, a prebaking, forming, and firing are performed successively. When it is desirable that the sensor elements 29 be also formed into an integral fashion, the base 24 may be produced as follows. First, ceramic green sheets formed into shapes corresponding to the disk-shaped substrate 21, the outer wall 22, and the column 23 are prepared by means of a proper known technique such as stamping. Then these green sheets are laminated into a single piece. Finally, degreasing and firing are performed.

The weight 25 of each sensor element 29 is a member suspended below each sector-shaped flexible plate 26 and responsible for deforming the flexible plate 26 in response to an inertial force generated by a force applied from the outside, depending on its magnitude and direction. Although there is no particular limitation in its shape, the weights 25 are preferably formed into a column or cylindrical shape. Furthermore, to achieve a high enough sensitivity, it is desirable that the material of the weights have a large enough mass, a high density, and a high elastic modulus so that the weights 25 are themselves are not deformed by the force applied on the weights 25. Various metallic or ceramic materials may be employed for this purpose.

Even when the weights 25 are made of such a preferable material, if the weights 25 are connected to the corresponding flexible plates 26 via a material having a low elastic modulus, then the force applied on the weights 25 are not well transferred to the flexible plate 26. The resultant problem is that the deformation of the flexible plate 26 becomes small. In view of the above, it is desirable that the weights 25 and the flexible plates 26 are produced in an integral fashion. In the case where individual members are produced separately and then combined tegether, if the weights 25 and the flexible plates 26 are made of a material having high heat resistance, they may be combined by means of welding or baking using a metallic paste or a glass paste. When such a high temperature process cannot be employed, the members may be bonded using a resin-based adhesive which exhibits as great an elastic modulus as possible after being cured.

The sector-shaped flexible plates 26 suspending the respective weights 25 are fixed across the ring-shaped cavity 28 formed between the outer wall 22 and the column 23. To prevent the weights 25 from being interfered with proper displacement, it is required that the weights 25 do not come into contact with the surface (the bottom of the cavity 28) of the disk-shaped substrate 21. Each flexible plate 26 has a sector shape whose inner and outer circumferences are defined by two concentric circles of the outer wall of the column 23 and the inner wall of the outer wall 22, respectively, and whose sides are defined by two lines extending from the center the concentric circles to arbitrary two point on the inner wall of the outer wall 22 so that the two lines make an angle less than $\pi/4$ rad. The shape of the flexible plates 26 is not limited to the sector shape described above, but any shape being long along one direction in a plane in a rectangular coordinate system may also be employed. For example, flexible plates 26 may also be formed into a rectangular shape, a polygon being long in one direction, or a combination of two ellipses located so that the major axes of the two ellipses are in a line and so that the combined shape has a small-width portion at the center.

To improve the sensitivity of the sensor, it is preferable that the flexible plates 26 can be deformed to a great extent within the range in which the flexible plates 26 are not broken by the displacement of the weights 25. For this purpose, metal, ceramic, glass, resin, or similar materials may be employed to form the flexible plates 26. When the flexible plates are made of a conductive material such as metal, it is required to make isolation between the flexible plates and the electrodes of the piezoelectric elements 27A and 27B located thereon.

The piezoelectric elements 27A and 27B are disposed on the inner and outer end portions on the upper surface of each flexible plate 26. When the flexible plate 26 is deformed, a corresponding stress occurs in the piezoelectric elements 27A and 27B. As a result, a charge corresponding to the magnitude and the direction of the stress is generated in the piezoelectric elements 27A and 27B. The magnitude and distribution of the charge is detected by the electrodes. From the detection result, the magnitude and the direction of the force applied on the multielement sensor 20 can be calculated.

To improve the sensitivity of the sensor whose piezoelectric elements 27A and 27B and flexible plates 26 are made of a piezoelectric material, it is preferable that the flexible plates 26 be produced into a thin film form using a material capable of generating a large amount of charges with a small deformation. Piezoelectric ceramic is a most preferable material for this purpose. More specifically, lead zirconate titanate (PZT) having a large piezoelectric constant is most preferable. Lead titanate, which exhibits anisotropy in the piezoelectric constant in a polarized state, may also be employed. If lead titanate ($PbTiO_3$) is employed, it is possible to adjust the sensitivity of the sensor by intentionally applying a force in a particular direction to a proper degree.

Materials preferable for the electrodes of the piezoelectric elements 27A and 27B include silver (Ag), gold (Au), palladium (Pd), platinum (Pt), and various alloys of these metals. In the case where the base 24, the flexible plates 26, and the weights 25 are produced in an integral fashion by means of the green sheet lamination technique using zirconia ceramic as will be described later, the electrodes may be formed as follows. An electrode paste is coated on the surface of the flexible plates 26 made of sintered zirconia, and then baking is performed. After that, a paste of piezoelectric material is screen-printed on the baked electrodes and the baking is performed. Finally, an electrode paste is screen-printed on the surface of the baked piezoelectric material, and then baking is performed. In the above process, screen-printing and baking for the electrodes and the piezoelectric material may be performed alternately as described above, or baking may be performed at last for all material after screen-printing and drying all materials including those for the electrodes and the piezoelectric material. In addition to the above-described methods, other methods including thick-film formation techniques such as spray coating and slurry coating and thin-film formation techniques such as sputtering, laser ablation, and CVD may also be employed to form the piezoelectric elements 27A and 27B on the flexible plates 26.

The multielement sensor 20 according to the present invention may be produced in various manners using various materials as described above. However, to dispose a great number of sensor elements 29 at correct positions, it is desirable to employ as simple a method as possible. For example, a laminating technique using green sheets of ceramic may be employed. In the multielement sensor 20 according to the present invention, zirconia ceramic is a most preferable material to form the base 24, the weights 25, and the flexible plates 26.

In this production technique, green sheets for the disk-shaped substrate 21, the outer wall 22, the cylindrical column 23, and the weights 25 are placed at predetermined positions in an one-on-another fashion. To form a required space (cavity), a carbon sheet formed into a desired shape for example by stamping is employed in the lamination so that the space is created during a firing process. Alternatively, a carbon powder layer or an organic binder layer may be formed by means of screen printing or coating. The thickness of various portions is controlled by properly selecting the thickness of the respective green sheets and also by properly selecting the number of lamination layers so that the respective green sheets for various portions are laminated in correct positions without registration errors. Then adjustment is performed so that the outer wall 22, the column 23, the weights 25, and the carbon sheet or the printed organic binder layer come to have the same height, and the gaps 30 are created by means of stamping thereby forming the flexible plates 26. Then a green sheet for the flexible plates 26 is placed so that the upper surface and the inner side of the outer wall 22 are entirely covered with the green sheet.

The resultant lamination structure is then subjected to a pressing process at room temperature, or at a high temperature if required. Then firing is performed thereby obtaining a single-piece structure in which the base 24, flexible plates 26, and the weights 25 are integrated. After that, the electrodes and the piezoelectric material are screen-printed and then baking is performed thereby forming the piezoelectric elements 27A and 27B thus obtaining the multielement sensor 20 in the complete form. The multielement sensor 20 produced in the above-described manner has the advantage that there is no connection and thus high reliability can be achieved. If the fact that the piezoelectric elements 27A and 27B are members essential to the sensor multielement sensor 20 and the fact that a high density can be obtained if PZT is employed as the piezoelectric material are taken into account, an alternative production process is to employ a piezoelectric ceramic material to form all portions of the multielement sensor 20. In this case, firing can be performed under fixed conditions, and thus production is easy. However, if firing shrinkage can be properly controlled and if connections between different materials can be easily made for example by means of pressing green sheets, then different materials in addition to the material for the piezoelectric elements 27A and 27B may also be employed.

In the production method described above, the flexible plates 27 are made of a piezoelectric material. This means that no additional piezoelectric material for the piezoelectric elements 27A and 27B is required. That is, if electrodes are formed directly on the upper and lower surfaces of the flexible plates 27, at inner and outer circumferential locations of the flexible plates 27, then the electrodes can detect an electric signal directly from the flexible plates 26 in response to their deformation. In this case, electrodes and leads are printed at correct positions on both surfaces of a green sheet for the flexible plates 26, and the inner wall of holes through which the leads are connected to the outside are also coated with the electrode material.

The above-described one-piece structure may also be produced in a different manner as described below using ceramic green sheets such as zirconia or PZT. That is, green sheets for the disk-shaped substrate 21, the outer wall 22, and the cylindrical column 23, respectively, and also a ring-shaped green sheet for the weights 25 are first laminated. In the above process, a carbon sheet which disappears during a firing process thus creating a desired space is also included in the lamination, or a carbon power layer or an organic binder layer is formed by means of a screen printing process or a coating process. After that, a disk-shaped green sheet for the flexible plates 26 is placed so that the upper surface and the inner side of the outer wall 22 are entirely covered with the green sheet, and firing is performed. On the resultant fired structure, a ring-shaped electrode and piezoelectric material are screen-printed at correct locations on the surface of the flexible plates 26, and then baking is performed thereby forming the piezoelectric elements 27A and 27B. Finally, unnecessary portions are removed by means of laser processing thereby forming the gaps 30. In the above production method, in the case where the flexible plates 26 are made of a piezoelectric material, electrodes may be printed, at an earlier stage of the process, on both surfaces of a green sheet for the flexible plates 26, and gaps 30 may be formed by means of laser processing after a firing process thereby producing a multielement sensor having flexible plates 26 which themselves function as the piezoelectric elements 27A and 27B.

The operation of the multielement sensor 20 is described below. In the most preferable case, the multielement sensor 20 is used as a two-dimensional sensor for detecting a force applied on the multielement sensor 20 in a direction parallel to the flat plane of the disk-shaped substrate 21. Herein, the orientation of each sensor element is represented by the direction of a line extending from the center of the multielement sensor 20 to the center of each sensor element 29. As is apparent from the analogy to the operation described earlier with reference to the conventional sensor 11 shown in FIG. 7, when a force is applied on the multielement sensor 20, each sensor element 29 responds depending on the angle between the direction of the force and the orientation of each sensor element 29, and thus detects a corresponding component of the force. For example, a maximum detection value, depending on the magnitude of the applied force, is output by those sensor elements whose orientation is coincident or nearly coincident with the direction of the force applied on the multielement sensor 20. Conversely, no force is detected by those sensor elements whose orientation is perpendicular to the direction of the applied force.

Figure 2:
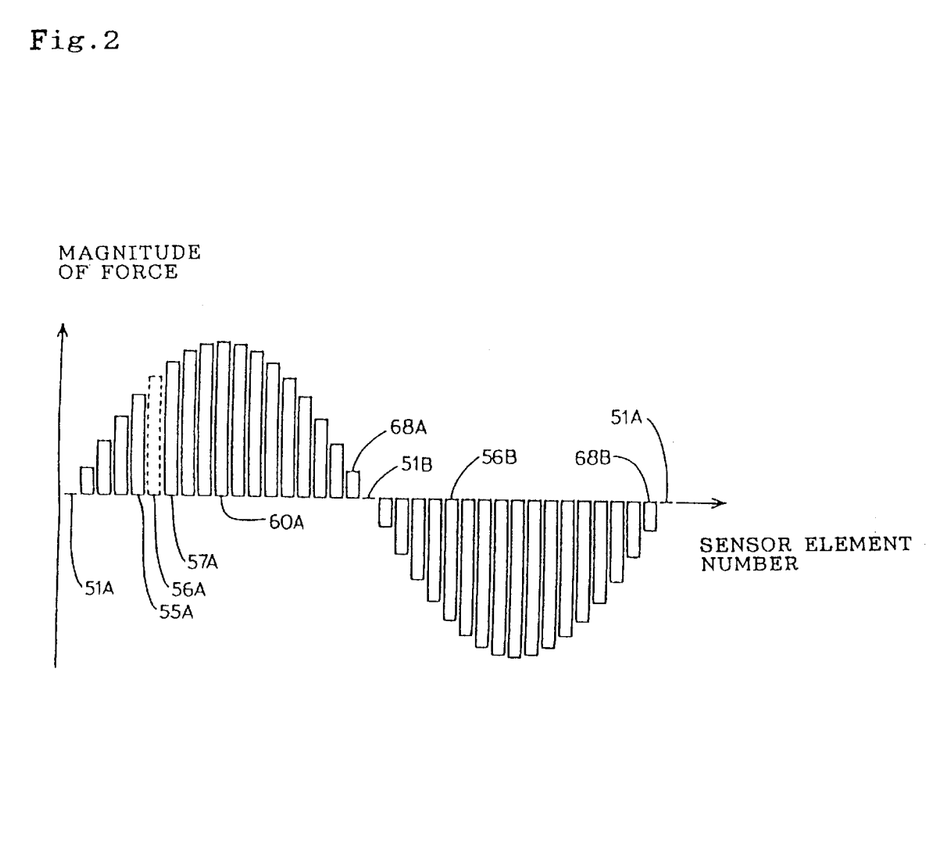
FIG. 2 is a graph illustrating an example of the detection result obtained by the multielement sensor according to the invention.

In the multielement sensor 20 shown in FIGS. 1(a) and (b), when a force is applied in a direction parallel to a line passing through the sensor elements 60A and 60B, the respective sensor elements provide various detection values which will have a sine-wave form as shown in FIG. 2 if the detection values from the sensor elements 51A–68A and 51B–68B are plotted from element to element on a graph. If it is desirable to define the direction of the force applied on the multielement sensor 20 in terms of the two-dimensional rectangular coordinates, the X and Y directions are defined by the sensor locations when the multielement sensor 20 is installed. For example, the X direction may be defined by a line passing through the sensor elements 51A and 51B, and the Y direction is defined by a line passing through the sensor elements 60A and 60B, which is perpendicular to the X direction defined above.

If one of 36 sensor elements 51A–68A and 51B–68B, for example the sensor element 56A, has a failure, and if the failed sensor 56A does not detect the force applied on the multielement sensor 20, then no detection value is output from the failed sensor element 56A. As a result, as represented by a broken line in the bar chart of FIG. 2, the detection value from the sensor element 56A is lost. If a similar failure occurs in conventional sensors having a small number of sensor elements, a zero value due to the failure is regarded incorrectly as absence of force, and calculation is performed without removing the incorrect detection value. As a result, the calculated force is incorrect.

In contrast, in the multielement sensor 20 according to the present embodiment of the invention, even when the sensor element 56A has a failure, the value which should be detected by the sensor element 56A can be estimated from the detection values given by the adjacent sensor elements 55A and 57A. Furthermore, the value which should be detected by the sensor element 56A may also be estimated from the detection value given by the sensor element 56B located at a position symmetric to the location of the sensor element 56A about the central point of the sensor, because the charge produced in the sensor element 56B would be equal in magnitude and opposite in polarity to the charge which would be produced in the sensor element 56A if there were no failure.

As described above, when there is a failed sensor element, an incorrect value output from the failed sensor element is detected by means of comparison with the detection values given by adjacent sensor elements or by the sensor element at the symmetric location about the center of the sensor, taking into account the distribution of detection values for all sensor elements. Such an incorrect detection value is rejected in the calculation of the magnitude and the direction of the force applied on the multielement sensor 20, and thus the calculation is always accurate regardless of the failure. If the detection result is displayed on a screen as shown in FIG. 2, it is possible to visually and instantly detect a failure in sensor elements. This prevents the multielement sensor 20 from being used in an incorrect fashion.

As can be understood from the operation principle described earlier with reference to the known sensor 11 shown in FIG. 7, the sensor elements 29 can also detect a force applied in a direction perpendicular to the flat plane of te disk-shaped substrate 21. This means that if some of a great number of sensor elements 29 disposed on the multielement sensor 20 are used to detect a force in the direction perpendicular to the flat plane of the disk-shaped substrate 21, then the multielement sensor 20 can be used as a three-dimensional sensor.

Figure 3:
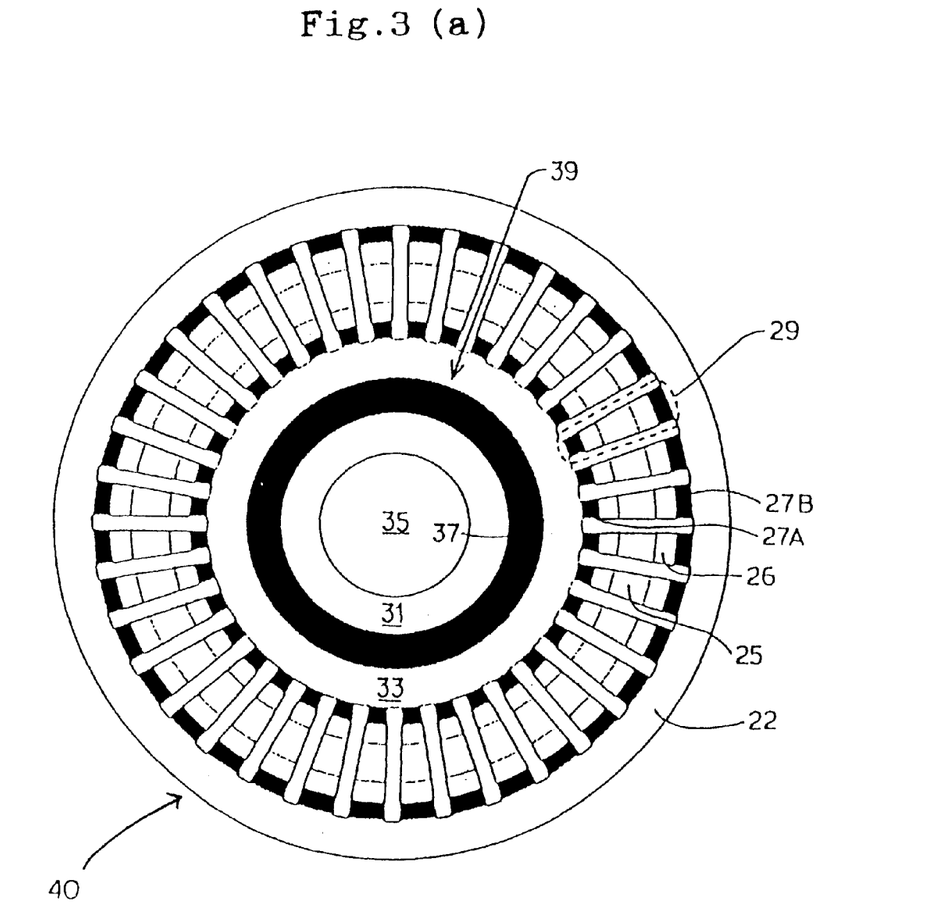
FIGS. 3(a) and 3(b) are a plan view and a cross-sectional view, respectively, of another embodiment of a multielement sensor according to the invention.

FIGS. 3(a) and 3(b) illustrate an embodiment of a multielement sensor 40 obtained by adding a sensor element 39 to the multielement sensor 20 described above so that a force in the direction perpendicular to the flat plane of the disk-shaped substrate 21 is detected by the sensor element 39, wherein a plan view and a cross-sectional view thereof are given in FIGS. 3(a) and 3(b), respectively.

The multielement sensor 40 may be produced by replacing the cylindrical column 23 of the multielement sensor 20 with a cylinder 33 and placing the sensor element 39 so that the space inside the cylinder 33 is covered by the sensor element 39. The sensor element 39 includes a flexible disk 31 and a weight 35 formed at the center of the flexible disk 31 wherein the weight 35 has a cylindrical shape symmetric about the center of the flexible disk 31 and has two portions one of which is located on one surface of the flexible disk 31 and the other portion is on the other surface. Furthermore, a piezoelectric element 37 is disposed in the outer peripheral area of the flexible disk 31 wherein the piezoelectric element 37 comprises a ring-shaped flat-plate piezoelectric material on which electrodes are formed. Alternatively, the weight 35 may also be formed so that it is suspended below the flexible disk 31. The multielement sensor 40 may be produced in a similar manner to the multielement sensor 20 described above. If the flexible plate 16 and the flexible disk 31 are made of a piezoelectric material, and if electrodes are formed directly thereon, then these flexible members may be used as the piezoelectric element.

In the multielement sensor 40, a force in a direction parallel to the flat plane of the disk-shaped substrata 21 is detected in the same manner as in the case of the multielement sensor 20, while the sensor element 39 operates in the same manner as described earlier with reference to the operation of the upper electrode A5 of the sensor 11 shown in FIG. 7. Thus, multielement sensor 40 can be used as a three-dimensional sensor capable of detecting a force in the direction perpendicular to the flat plane of the disk-shaped substrate 21, and having high accuracy in the detection of a force in the direction parallel to the flat plane of the disk-shaped substrate 21 as is obtained in the multielement sensor 20.

As in the case of the multielement sensor 20 in which some of sensor elements 29 can be used to detect a force in a direction perpendicular to the plane of the disk-shaped substrate 21, the multielement sensor 40 can also be used in a similar manner thereby achieving high accuracy in detection for any direction regardless of a failure of some sensor element.

Figure 4:
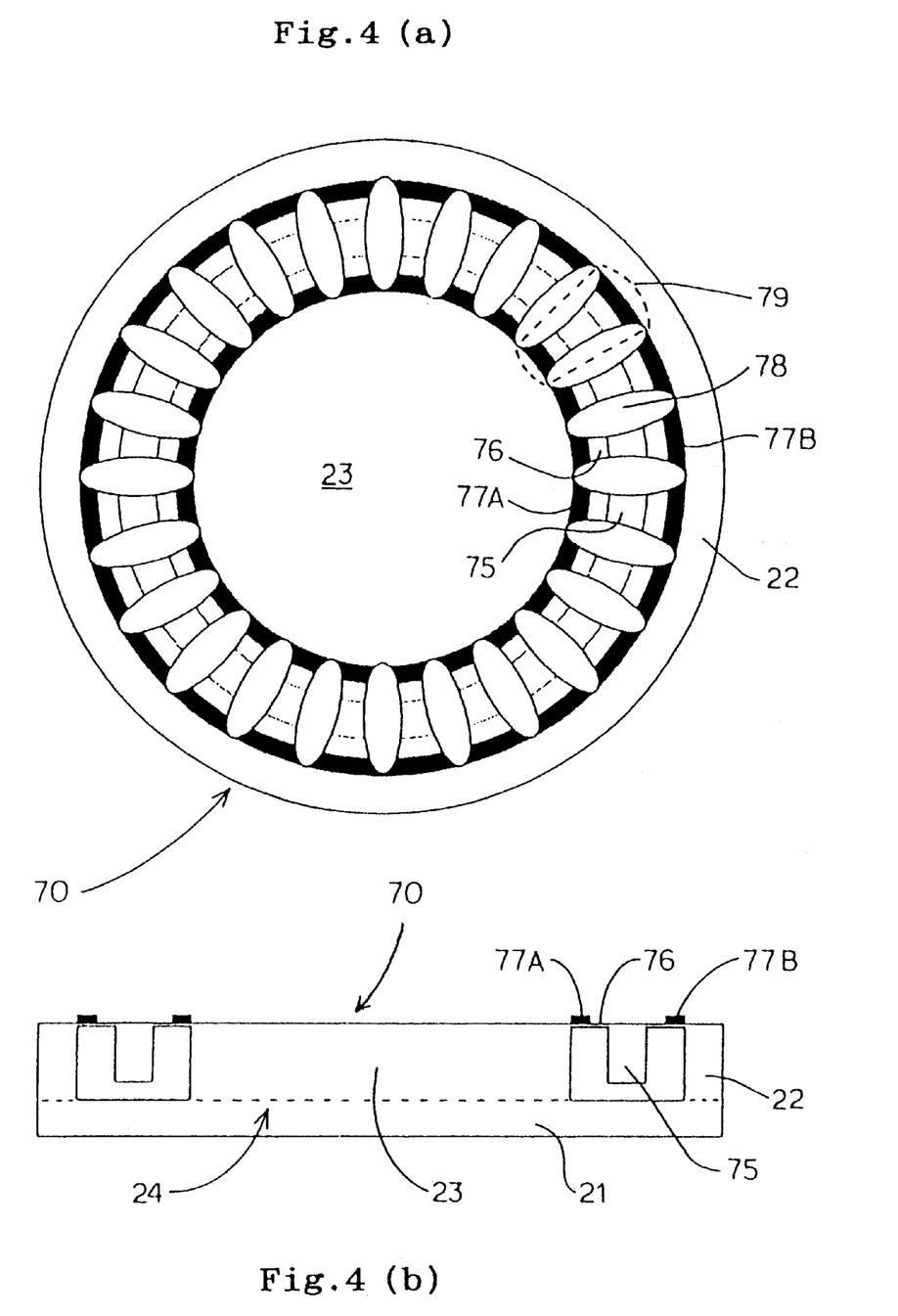
FIGS. 4(a) and 4(b) are a plan view and a cross-sectional view, respectively, of still another embodiment of a multielement sensor according to the invention.

FIGS. 4(a) and 4(b) illustrate another embodiment of a multielement sensor 70 according to the invention, wherein a plan view and a cross-sectional view thereof are given in FIGS. 4(a) and 4(b), respectively. In this multielement sensor 70, gaps between adjacent sensor elements 79 are formed into an elliptic shape, and the both sides of flexible plates 76 are made concave by the gaps. Rods having a cross-sectional shape corresponding to the shape of the flexible plates 76 are suspended below the flexible plates 76 so that they serve as weights 75. Piezoelectric elements 77A and 77B having a shape corresponding to that of the flexible plates 76 are formed on both ends in the longitudinal direction of the flexible plates 76. The other elements are formed in a similar manner to the multielement sensor 20, and thus multielement sensor 70 may be produced in a similar manner to the multielement sensor 20. The multielement sensor 70 may be used in a similar manner to the multielement sensor 20.

Figure 5:
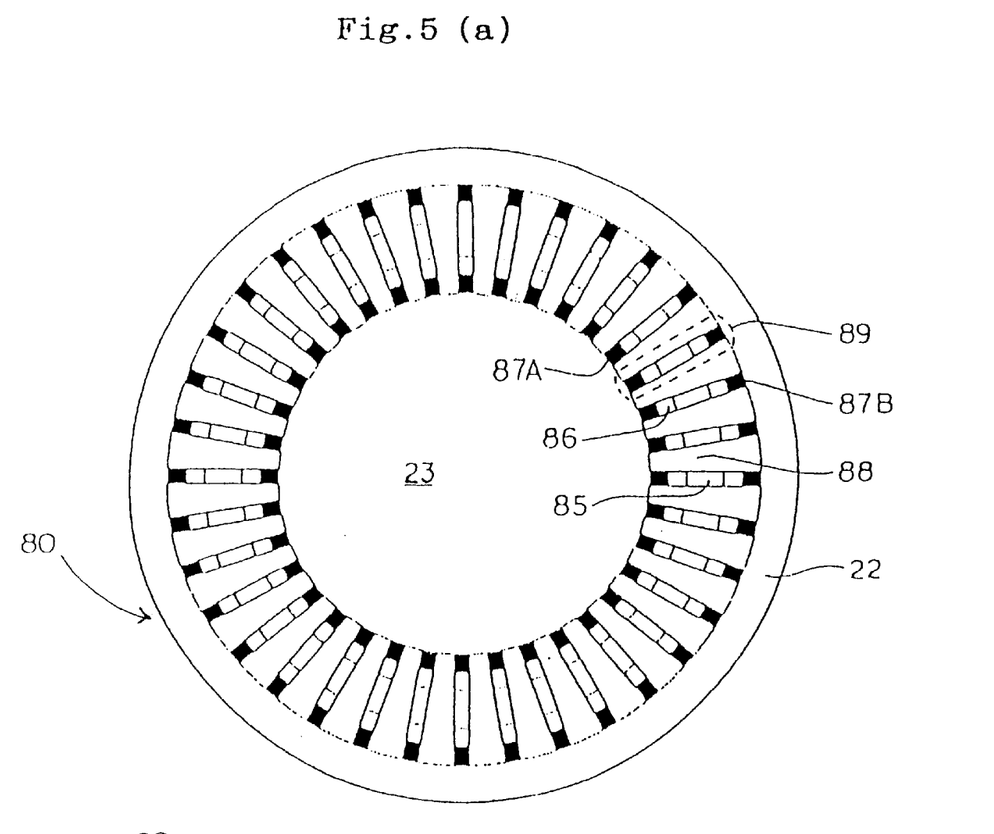
FIGS. 5(a) and 5(b) are a plan view and a cross-sectional view, respectively, of still another embodiment of a multielement sensor according to the invention.

FIGS. 5(a) and 5(b) illustrate still another embodiment of a multielement sensor 80 according to the invention, wherein its plan view and cross-sectional view are given in FIGS. 5(a) and 5(b), respectively. In the multielement sensor 80, flexible plates 86 of the respective sensor elements 89 are formed into a rectangular shape, and gaps 88 are formed into a sector shape. Weights 85 and piezoelectric elements 87A and 87B are formed into shapes corresponding to the shape of the flexible plates 86. The multielement sensor 80 may be produced and operated in a similar manner to the multielement sensor 20.

Figure 6:
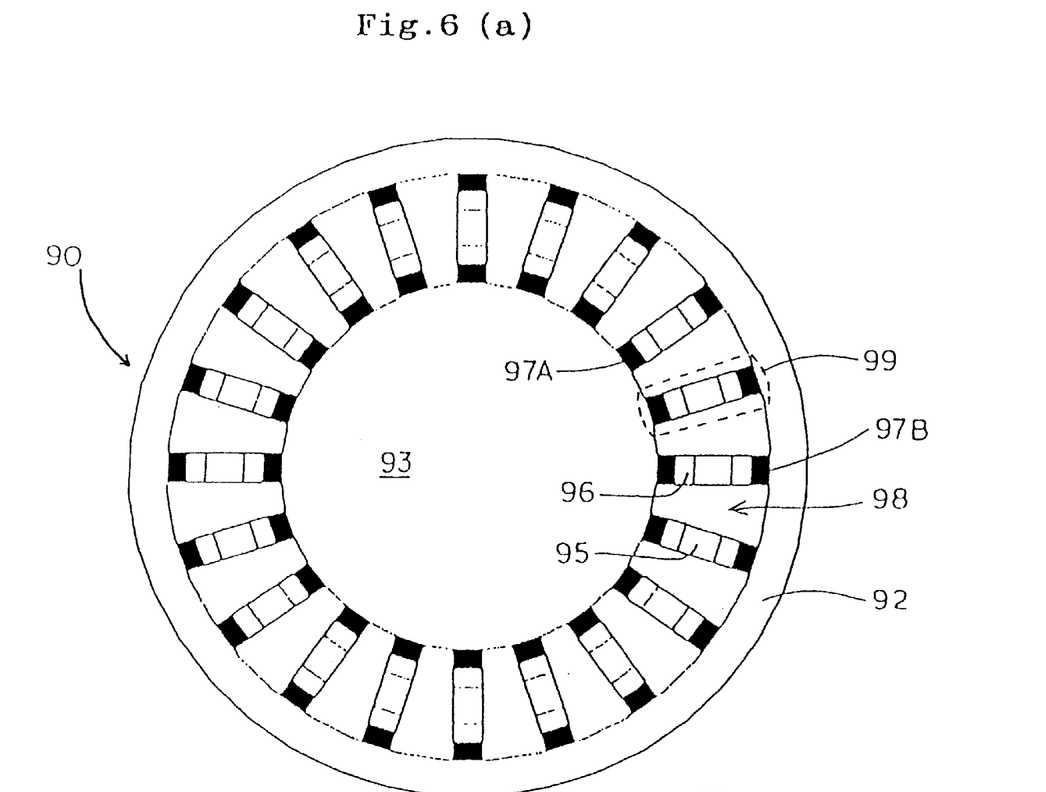
FIGS. 6(a) and 6(b) are a plan view and a cross-sectional view, respectively, of still another embodiment of a multielement sensor according to the invention.

FIGS. 6(a) and 6(b) illustrate an embodiment of a multielement sensor 90, wherein its plan view and cross-sectional view are given in FIGS. 6(a) and 6(b). In this multielement sensor 90, a substrate 91 in the form of a regular polygon having 40 sides, an outer wall 92, and a column 93 are disposed so that the centers of these elements are located at the same point and so that a ring-shaped cavity 98 is formed between the outer wall 92 and the column 93. Sensor elements 99 each comprising a rectangular-shaped flexible plate 96, a weight 95, and piezoelectric elements 97A and 97B are disposed in a circular line along the ring-shaped cavity in such manner that each sensor element 99 extends across the ring-shaped cavity. The multielement sensor constructed in the above-described manner can also be operated in a similar manner to the multielement sensor 20. Although in this embodiment the substrate 91 is formed into the shape of the regular polygon with 40 sides, the substrate may also be formed into the shape of a polygon with an arbitrary number of sides as long as the number of sides is equal to or greater than 4. More preferably, the polygon has a shape symmetric about its center.

As described above, the multielement sensor according to the invention has the advantage that when a failure occurs in some sensor element, the failure is detected by comparing its detection value with the detection values given by a great number of sensor elements, and the incorrect detection value is compensated for using the detection values given by the other sensor elements thereby ensuring that high accuracy is achieved regardless of the failure. Furthermore, if the detection result is displayed on a monitor device, the magnitude and the direction of the force applied on the multielement sensor can be visually determined. In this case, a failure can also be detected visually.

Although the present invention has been described above with reference to specific embodiments, the invention is not limited to the details of these embodiments. It should be understood that various modifications, improvements, and changes are possible for those skilled in the art without departing from the scope of the invention.

What is claimed is:

1. A multielement sensor comprising:

a base comprising a substrate, an outer wall formed on a peripheral portion of said substrate and having an uniform thickness and an uniform height, and a column having a height equal to that of said outer wall and disposed inside said outer wall on said substrate in such a manner that the center of said column is located at the same point where the center of said substrate is located and such that a ring-shaped cavity is formed between said outer wall and said column;

sensor elements each comprising a flexible plate having a flat plate shape being long along one direction in a rectangular coordinate system in a plane, a weight located at the center of one flat surface of said flexible plate, and piezoelectric elements each having one pair of opposite electrodes, said piezoelectric elements being located on the flat surface opposite to the flat surface on which said weight is located, one of said piezoelectric elements being located on one end in the longitudinal direction of said flexible plate and the other piezoelectric element being located on the other end of said flexible plate;

said sensor elements being disposed in a circular line along said ring-shaped cavity in such a manner that each sensor element extends across said ring-shaped cavity, one end of the flexible plate is in contact with said column and the other end is in contact with said outer wall, and in such a manner that the weight of each sensor element is suspended in said ring-shaped cavity, said flexible plates and said piezoelectric elements being deformed by said weight in response to a force applied on said weight thereby detecting a charge produced in said piezoelectric elements thus detecting the force applied on said weights, at least four or more said sensor elements being disposed around an axis, at locations symmetric about said axis, said axis passing through the center of said substrate and extending in a direction perpendicular to a flat plane of said substrate, said sensor elements being disposed so that said sensor elements are not in contact with each other.

2. A multielement sensor according to claim 1, wherein said base, flexible plates, and weights are produced into an integral fashion by means of a laminating process using zirconia green sheets, and said piezoelectric elements are produced by forming electrodes and piezoelectric materials by means of a screen printing process and a baking process performed thereafter.

3. A multielement sensor according to claim 1, wherein said base, flexible plates, and weights are produced into an integral fashion by means of a laminating process using green sheets of a piezoelectric ceramics.

4. A multielement sensor according to claim 1, wherein said flexible plates are made of piezoelectric ceramic, and instead of said piezoelectric elements, pairs of electrodes are formed directly on both ends in the longitudinal direction of the respective flexible plates in such a manner that said flexible plates are sandwiched between said pairs of electrodes, thereby making said flexible plates have the function performed by said piezoelectric elements.

5. A multielement sensor according to claim 3, wherein said flexible plates are made of piezoelectric ceramic, and instead of said piezoelectric elements, pairs of electrodes are formed directly on both ends in the longitudinal direction of the respective flexible plates in such a manner that said flexible plates are sandwiched between said pairs of electrodes, thereby making said flexible plates have the function performed by said piezoelectric elements.

6. A multielement sensor comprising:

a base comprising a substrate, an outer wall formed on a peripheral portion of said substrate and having an uniform thickness and an uniform height, and a cylindrical wall having an uniform thickness and having a height equal to that of said outer wall, said cylindrical wall being disposed inside said outer wall on said substrate in such a manner that the center of said cylindrical wall is located at the same point where the center of said substrate is located;

first sensor elements each comprising a first flexible plate having a flat plate shape being long along one direction in a rectangular coordinate system in a plane, a first weight located at the center of one flat surface of said first flexible plate, and first piezoelectric elements each having one pair of opposite electrodes, said first piezoelectric elements being located on the flat surface opposite to the flat surface on which said first weight is located, one of said first piezoelectric elements being located on one end in the longitudinal direction of said first flexible plate and the other first piezoelectric element being located on the other end of said first flexible plate;

a second sensor element comprising: a second flexible plate; a second weight having a column shape disposed at the center of said second flexible plate so that the center of said second weight is located at the same point where the center of said second flexible plate is located; and a second piezoelectric element disposed in an outer peripheral area on one surface of said second flexible plate, said second piezoelectric element comprising a piezoelectric material in the form of a ring-shaped flat plate, second electrodes being formed on both surfaces of said piezoelectric material, said second piezoelectric element having a shape symmetric about the central point of said second flexible plate;

said first sensor elements being disposed in a circular line along a ring-shaped cavity, formed between said outer wall and said cylindrical wall, in such a manner that each first sensor element extends across said ring-shaped cavity, one end of said first flexible plate is in contact with said cylindrical wall and the other end is in contact with said outer wall, and in such a manner that said first weight of each said first sensor element is suspended in said ring-shaped cavity, said first flexible plate and said first piezoelectric elements being deformed by said first weight in response to a force applied on said first weight thereby detecting a charge produced in said first piezoelectric elements, said second sensor element being disposed on the top of a cavity formed inside said cylindrical wall so that said second piezoelectric element is located on the outer surface of said second sensor element and so that said cavity is covered by said second sensor element sensor, said second sensor being responsible for detecting a charge generated in said second piezoelectric element, said charge being generated by deformation occurring in said second flexible plate and in said second piezoelectric element in response to a force applied on said second weight in a direction perpendicular to a flat plane of said substrate, thereby detecting a charge produced in said second piezoelectric element, thereby detecting the force applied on said first and second weights, wherein at least four or more said first sensor elements are disposed around an axis, at locations symmetric about said axis, said axis passing through the center of said substrate and extending in a direction perpendicular to the flat plane of said substrate, said first sensor elements being disposed so that said first sensor elements are not in contact with each other.

7. A multielement sensor according to claim 6, wherein said base, first and second flexible plates, and first and second weights are produced into an integral fashion by means of a laminating process using zirconia green sheets, and said first and second piezoelectric elements are produced by forming electrodes and piezoelectric materials by means of a screen printing process and a baking process performed thereafter.

8. A multielement sensor according to claim 6, wherein said base, first and second flexible plates, and first and second weights are produced into an integral fashion by means of a laminating process using green sheets of piezoelectric ceramic.

9. A multielement sensor according to claim 6, wherein:

said first and second flexible plates are made of piezoelectric ceramic, instead of said first piezoelectric elements, pairs of electrodes are formed directly on both ends in the longitudinal direction of the respective flexible plates in such a manner that said flexible plates are sandwiched between said pairs of electrodes, thereby making said flexible plates have the function performed by said first piezoelectric elements; and instead of said second piezoelectric elements, a pair of electrodes is formed in an outer peripheral portion of said second flexible plate in such manner that said second flexible plate is sandwiched between said pair of electrodes, thereby making said second flexible plate have the function performed by said second piezoelectric element.

10. A multielement sensor according to claim 8, wherein:

said first and second flexible plates are made of piezoelectric ceramic, instead of said first piezoelectric elements, pairs of electrodes are formed directly on both ends in the longitudinal direction of the respective flexible plates in such a manner that said flexible plates are sandwiched between said pairs of electrodes, thereby making said flexible plates have the function performed by said first piezoelectric elements; and instead of said second piezoelectric elements, a pair of electrodes is formed in an outer peripheral portion of said second flexible plate in such manner that said second flexible plate is sandwiched between said pair of electrodes, thereby making said second flexible plate have the function performed by said second piezoelectric element.

* * * * *